April 8, 1924.  W. WOSTENBERG  1,490,056
TRACTOR
Filed April 18, 1922

William Wostenberg INVENTOR
BY Victor J. Evans ATTORNEY

WITNESSES

Patented Apr. 8, 1924.

1,490,056

UNITED STATES PATENT OFFICE.

WILLIAM WOSTENBERG, OF WORLAND, WYOMING.

TRACTOR.

Application filed April 18, 1922. Serial No. 554,737.

*To all whom it may concern:*

Be it known that I, WILLIAM WOSTENBERG, a citizen of the United States, residing at Worland, in the county of Washakie and State of Wyoming, have invented new and useful Improvements in Tractors, of which the following is a specification.

This invention relates to improvements in tractors, the general object of the invention being to provide means for facilitating the steering of a tractor provided with a pair of endless tracks, each of which is provided with a propelling engine.

A further object of the invention is to provide means whereby the belt pulley can be driven by one or both engines.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
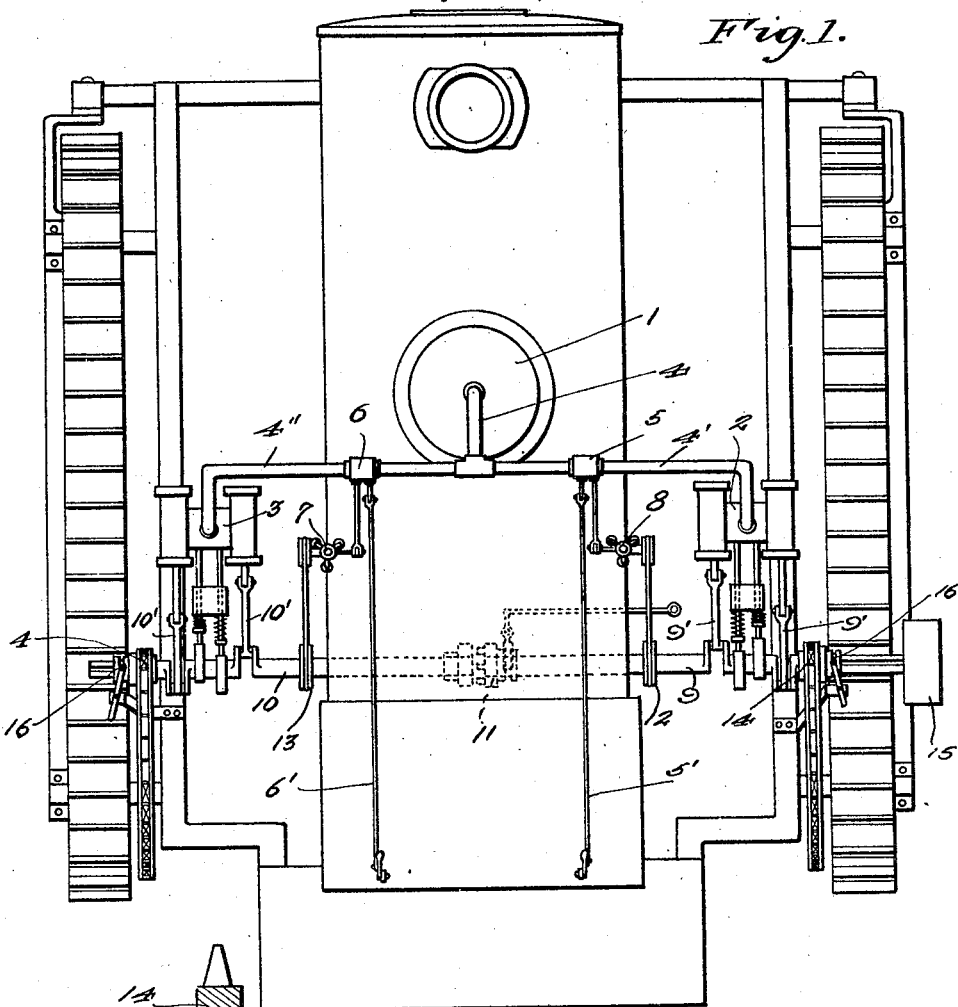
Figure 1 is a diagrammatic plan view of the invention.
Figures 2, 3:
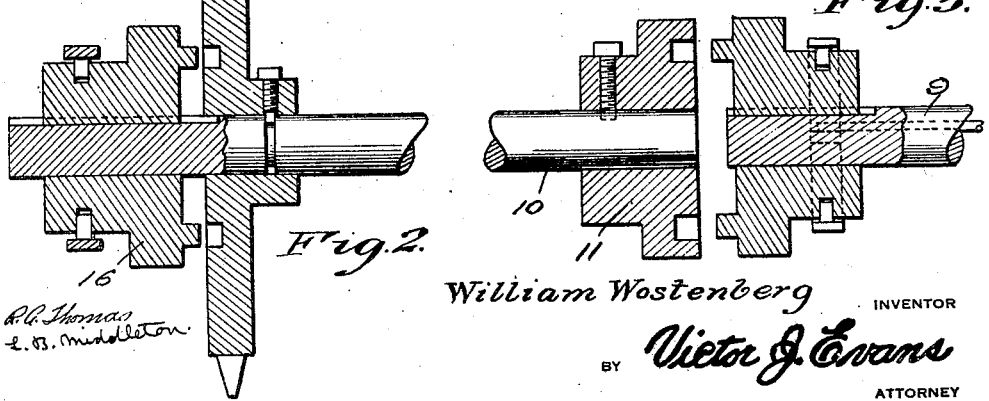
Figure 2 is a sectional detail view of the clutch 16.
Figure 3 is a sectional detail view of the clutch 11.

In these views 1 indicates the steam dome of the boiler of the tractor, 2 indicates the right hand engine and 3 the left hand engine. A forked pipeline 4 connects the engines with the dome, a valve 5 being arranged in the branch 4′ which leads to the engine 2 and a valve 6 being arranged in the branch 4″ which leads to the engine 3. Governors 7 and 8 are provided for controlling the flow of steam through the main line 4. The valves 5 and 6 are controlled by the throttle means 5′ and 6′ so that steam can be admitted to either engine or both engines as desired. The crank shaft is a sectional one, one section being shown at 9 and the other at 10. The cranks are connected with the pistons of the engines by the connecting rods 9′ and 10′. The two sections of the crank shaft can be attached to each other by the clutch 11 which is provided with suitable means for manually moving the same into engaging and disengaging position. The section 9 is provided with a pulley 12 which is belted to governor 8 and the section 10 is provided with a belt pulley 13 which is belted to governor 7. Each section of the crank shaft is provided with a pinion 14 for engaging the endless tracks at each side of the tractor and the section 9 has secured thereto the belt pulley 15 used for stationary work. This belt pulley can be driven by both engines by placing the clutch 11 in operative position to connect the two halves of the crank shaft together or it can be driven by one engine by moving the clutch 11 into inoperative position. When the belt pulley 15 is being used the pinions 14 are disconnected from the crank shaft by the clutches 16.

From the above it will be seen that the tractor can be easily steered by supplying steam to one engine and cutting off the steam to the other engine so as to cause one track to revolve and the other to remain stationary. When the tractor is to travel in a straight line the valves 5 and 6 are opened to the same extent so that the two engines will operate at the same speed. The flow of steam to each engine is also controlled by a governor which is actuated from that part of the crank shaft which is controlled by the engine. Each engine is of the double cylinder two-way type and by providing the same with reversing means braking means are unnecessary as the reverse may be used as a brake.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a tractor of the track laying type, a sectional crank shaft, a pinion on each section engaging each track of the tractor, clutch means for each pinion, a belt pulley on one section, clutch means for connecting the sections together, an engine for driving each section, a steam supply for the engines and throttle means for each engine.

In testimony whereof I affix my signature.

WILLIAM WOSTENBERG.